UNITED STATES PATENT OFFICE.

OTTO SCHMIDT, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

PRODUCING SOLUBLE TANNING AGENTS.

1,216,612.  Specification of Letters Patent.  Patented Feb. 20, 1917.

No Drawing.  Application filed July 2, 1914.  Serial No. 841,664.

*To all whom it may concern:*

Be it known that I, OTTO SCHMIDT, citizen of the German Empire, residing at Ludwigshafen-on-the-Rhine, Germany, have invented new and useful Improvements in Producing Soluble Tanning Agents, of which the following is a specification.

Several of the natural tanning agents, whether in the form of extract, or not, have the undesirable property of being either only difficultly soluble, or insufficiently soluble, in cold water. Thus, for instance, the ingredients of the valuable quebracho extract which possess tanning properties are, in a large proportion, insoluble, or difficultly soluble.

I have found that such natural tanning extracts can be converted into products which are readily soluble in cold water by treating them with an aromatic sulfonic acid of an amorphous character, which is free from phenol, quinone and quinone-imid groups, is soluble in water and is capable of precipitating glue or gelatin from solutions thereof. As particular compounds which can be employed according to this invention, I mention the soluble condensation products obtainable from naphthalene, formaldehyde and sulfuric acid, which products are free from hydroxyl groups, but contain at least one sulfonic acid group. I mention, further, other products obtainable according to the specification of my application for patent, Serial No. 804,745, filed December 4, 1913.

The process of my invention gives rise to products which are soluble in cold water and are therefore eminently adapted for use in tanning. The said process can be carried out either by adding the said condensation product to the prepared tanning extract, or to the difficultly soluble parts thereof. Or it is equivalent to add the said product to the thin solution which is at first obtained and then subsequently to concentrate the treated solution. The mixtures can be effected, or maintained, either at ordinary temperatures, or at raised temperatures. In some cases, the addition of the condensation product to the tanning extract tends to bleach the said extract, and this is a further advantage.

The following is an example of how my invention may be carried into practical effect, but the invention is not limited to this example. The parts are by weight.

Example.

Heat together for about six hours at 150° C., 10 parts of naphthalene and 10 parts of 97 per cent. sulfuric acid. Then cool to about 80° C. at the same time adding 2 parts of water, and then, while maintaining this temperature, add 4.3 parts of 30 per cent. formaldehyde solution and continue stirring until the odor of formaldehyde has disappeared. Then add caustic soda solution of 35 per cent. until 10 grams of the product require, for complete neutralization, 10 cubic centimeters of normal caustic soda solution. Take 2000 parts of the paste thus obtained and introduce them slowly, while warming, into a hot mixture of 2000 parts of solid quebracho extract with 2000 parts of water. In this way, a clear solution is obtained which can be diluted with water as required without becoming dull, and which, after dilution, can be directly used for tanning.

In a similar manner, solutions of other difficultly soluble extracts, such as mangrove and chestnut can be prepared, and other condensation products of the aforesaid type can be employed.

Now what I claim is:—

1. The process of converting difficultly soluble or insufficiently soluble tanning extracts into more soluble compounds by treating such difficultly soluble or insufficiently soluble extracts with an aromatic sulfonic acid of an amorphous character, which is free from phenol, quinone and quinone-imid groups, is soluble in water and is capable of precipitating glue or gelatin from solutions thereof.

2. The process of converting difficultly soluble or insufficiently soluble tanning extracts into more soluble compounds by treating such difficultly soluble or insufficiently soluble extracts with a soluble condensation product of naphthalene, formaldehyde and sulfuric acid, which product is free from hydroxyl groups, and contains at least one sulfonic acid group.

3. The process of converting difficultly soluble or insufficiently soluble tanning extracts into more soluble compounds by treating such difficultly soluble or insufficiently soluble extracts with the product obtainable from 10 parts of naphthalene, 10 parts of sulfuric acid, and 4.3 parts of 30 per cent. formaldehyde, which product is soluble in water, contains at least one sulfonic acid group, and is free from hydroxyl groups.

In testimony whereof I have hereunto set my hand in the presence of two subscribing witnesses.

OTTO SCHMIDT.

Witnesses:
H. MERLE COCHRAN.
J. ALEC LLOYD.